United States Patent
Pishnov et al.

(10) Patent No.: US 7,434,843 B1
(45) Date of Patent: Oct. 14, 2008

(54) HOLLOW SHAFT FLUID ROTARY JOINT

(75) Inventors: Zakhar Pishnov, Stamford, CT (US);
Henry E. Reinhardt, Wilton, CT (US);
Anthony N. Fischetti, Monroe, CT (US)

(73) Assignee: Northrop Grumman Corporation, Los Angeles, CA (US)

( * ) Notice: Subject to any disclaimer, the term of this patent is extended or adjusted under 35 U.S.C. 154(b) by 217 days.

(21) Appl. No.: 11/098,428

(22) Filed: Apr. 5, 2005

Related U.S. Application Data

(60) Provisional application No. 60/559,975, filed on Apr. 7, 2004.

(51) Int. Cl.
*F16L 17/00* (2006.01)
*F16L 27/00* (2006.01)
*H01Q 3/02* (2006.01)

(52) U.S. Cl. ............ 285/98; 285/96; 285/106; 285/121.3; 285/121.5; 343/882

(58) Field of Classification Search .......... 285/95, 285/96, 98, 106, 121.1, 121.3, 121.5, 121.6; 343/882; 464/18; 384/479
See application file for complete search history.

(56) References Cited

U.S. PATENT DOCUMENTS

| | | | | | |
|---|---|---|---|---|---|
| 2,460,872 | A | * | 2/1949 | Carpenter | 285/121.5 |
| 2,701,146 | A | * | 2/1955 | Warren | 285/121.5 |
| 2,948,554 | A | * | 8/1960 | Mahand | 384/479 |
| 3,291,490 | A | * | 12/1966 | Balmer | 277/322 |
| 3,621,443 | A | * | 11/1971 | Sewell | 439/27 |
| 4,391,298 | A | * | 7/1983 | Ortloff | 137/615 |
| 4,441,522 | A | * | 4/1984 | Griffin | 137/615 |
| 4,545,692 | A | * | 10/1985 | Bras et al. | 384/477 |
| 4,635,971 | A | * | 1/1987 | Perratone et al. | 285/121.3 |
| 4,819,002 | A | * | 4/1989 | Reboullet | 343/765 |
| 4,828,292 | A | * | 5/1989 | Jansen | 285/93 |
| 4,844,138 | A | * | 7/1989 | Kokubu | 152/417 |
| 4,969,423 | A | * | 11/1990 | Kitauchi et al. | 123/65 R |
| 5,048,981 | A | * | 9/1991 | Ide | 384/607 |
| 5,110,159 | A | * | 5/1992 | Herold et al. | 285/121.5 |
| 5,248,986 | A | * | 9/1993 | Marshall | 343/715 |
| 5,503,480 | A | * | 4/1996 | Caillaut et al. | 384/477 |
| 5,662,312 | A | * | 9/1997 | Leggett et al. | 254/390 |
| 6,485,062 | B2 | * | 11/2002 | Omiya et al. | 258/121.1 |
| 6,851,724 | B2 | * | 2/2005 | Pittman, II | 285/275 |
| 6,989,799 | B1 | * | 1/2006 | Pittman, II | 343/882 |
| 7,083,200 | B2 | * | 8/2006 | Falconer | 285/121.3 |
| 7,118,137 | B2 | * | 10/2006 | Deremiah | 285/93 |
| 2003/0234535 | A1 | * | 12/2003 | Pittman | 285/121.1 |

* cited by examiner

*Primary Examiner*—James M Hewitt
(74) *Attorney, Agent, or Firm*—Rothwell, Figg, Ernst & Manbeck

(57) ABSTRACT

In the preferred embodiments, a hollow shaft rotary fluid joint assembly includes: (a) a hollow shaft through which electrical cables are passed; (b) a rotary fluid joint surrounding an outer diameter of the hollow shaft through which a fluid medium is passed, the rotary fluid joint including inner and outer races defining an interior chamber that are rotatably connected together and that include one or more respective inlet or outlet port.

22 Claims, 8 Drawing Sheets

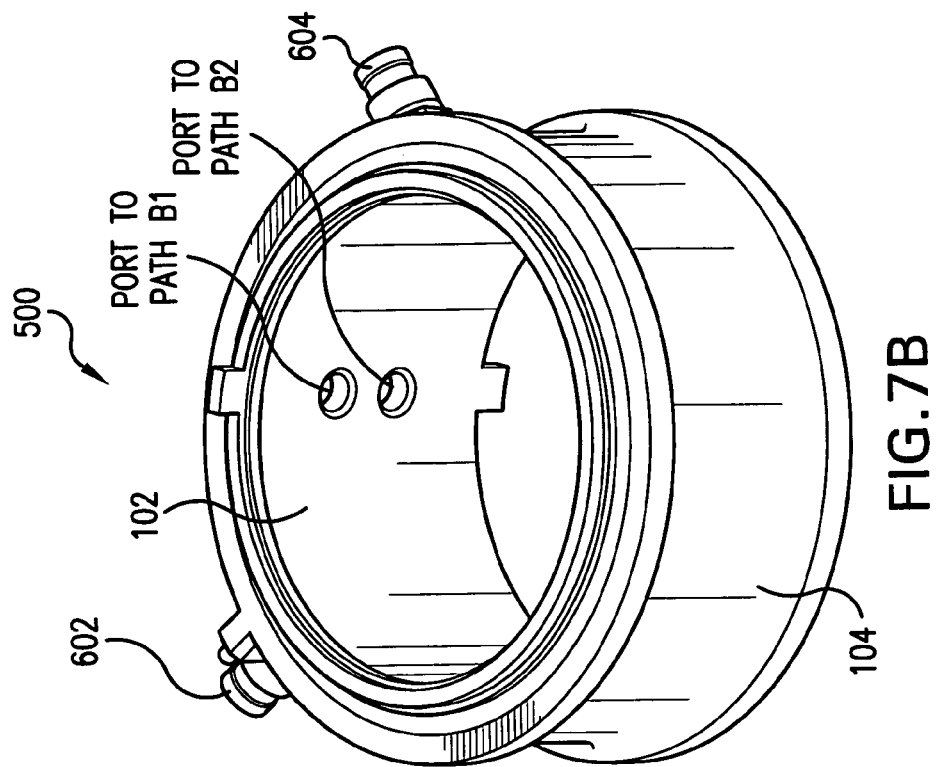
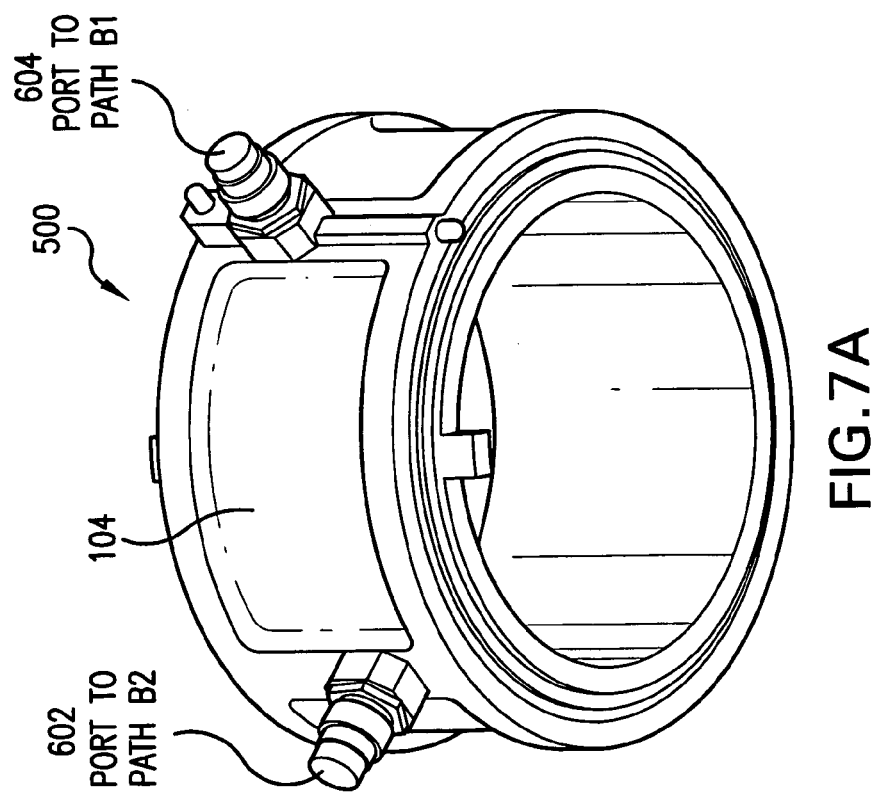
FIG. 7A
FIG. 7B

HOLLOW SHAFT FLUID ROTARY JOINT

This application claims the benefit of U.S. Provisional Patent Application No. 60/559,975, filed Apr. 7, 2004, the disclosure of which is incorporated herein by reference in its entirety.

The work described in this application was done in connection with Air Force contract number F19628-00-C-0100. The government may have certain rights to this invention.

BACKGROUND OF THE INVENTION

1. Field of the Invention

The present invention relates to fluid joints. More specifically, the preferred embodiments provide a novel fluid joint having a hollow interior shaft.

2. Discussion of the Background

In the past, electronically scanned antennas did not rotate continuously. As a result, swivel joints and rotary joints having fluids that passed through their center were generally sufficient. However, such existing methods have limitations in some applications, such as, e.g., related to high-powered electronically scanned antennas using continuous rotation.

SUMMARY OF THE INVENTION

The preferred embodiments of the present invention can significantly improve upon existing methods and/or apparatuses.

Among other things, the preferred embodiments combine (a) a hollow shaft that enables cables and the like to pass through with (b) a fluid rotary joint that passes through an outer diameter so as to, among other things, free-up the interior region.

Among other things, the preferred embodiments create a sliding interface between the hollow shaft fluid rotary joint's bore (i.e., fluid chamber) and the rotational spindle, which can help create a thermally conductive path and normalize the gimbals, temperature. Among other things, this can help to minimize thermal expansion between the aluminum spindle and the steel bearing of the gimbals.

Among other things, the preferred embodiments can also include durable bearings that allow for high rotational speeds and that accommodate a high number of revolutions per minute (RPMs) and can also include hydraulic seals that create a sealed chamber for fluid to inhibit or prevent fluid leakage.

In some embodiments, the above and/or other problems in existing systems can be solved by a rotary joint that provides a stationary to rotational transition with a clear passage through its center of rotation.

In some embodiments, a hollow shaft fluid rotary joint is provided that permits the passage of cables, wiring and/or the like through its center while coolant and/or another flowable medium is pumped through an outside diameter of the rotary joint, which allows, e.g., for cooling through continuous rotation. In preferred embodiments, a durable bearing is also employed that accommodates high rotational speeds.

In some embodiments, a hollow shaft rotary fluid joint assembly is provided that includes: a) a hollow shaft through which electrical cables are passed; b) a rotary fluid joint surrounding an outer diameter of said hollow shaft through which a fluid medium is passed, said rotary fluid joint including inner and outer races defining an interior chamber that are rotatably connected together and that include one or more respective inlet or outlet port.

Preferred embodiments of the invention can be used in any rotational mechanism that needs a passage through its center of rotation and fluid flow, such as, e.g., for cooling capability and/or the like. The preferred embodiments are especially suitable for, among other things, substantially any electronically scanned antenna program.

In another aspect, the present invention provides an apparatus comprising a coaxial fluid rotary joint. In some embodiments, the coaxial fluid rotary joint includes: a first generally annular structure; a second generally annular structure surrounded by the first annular structure and coaxially aligned with the first annular structure; a bearing disposed between the first and second annular structures to enable at least one of the annular structures to rotate relative to the other annular structure about a common axis; an internal fluid channel formed between an outer surface of the second annular structure and an inner surface of the first annular structure; an input port in fluid communication with the fluid channel; and an output port in fluid communication with the fluid channel.

The above and other aspects, features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, help illustrate various embodiments of the present invention and, together with the description, further serve to explain the principles of the invention and to enable a person skilled in the pertinent art to make and use embodiments of the invention. In the drawings, like reference numbers indicate identical or functionally similar elements.

FIGS. 7(A) and 7(B) are bottom and top perspective views, respectively, of the hollow shaft fluid rotary joint shown in FIG. 5.

DETAILED DESCRIPTION OF PREFERRED EMBODIMENTS

Figure 1:
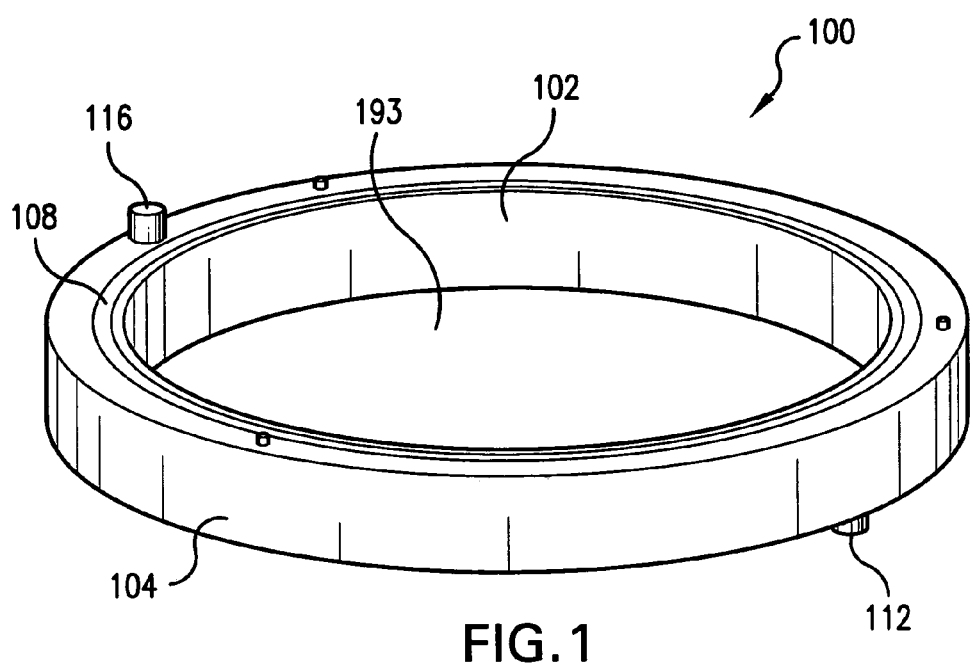
FIG. 1 is a perspective view of a hollow shaft fluid rotary joint according to some embodiments.
Figure 2:
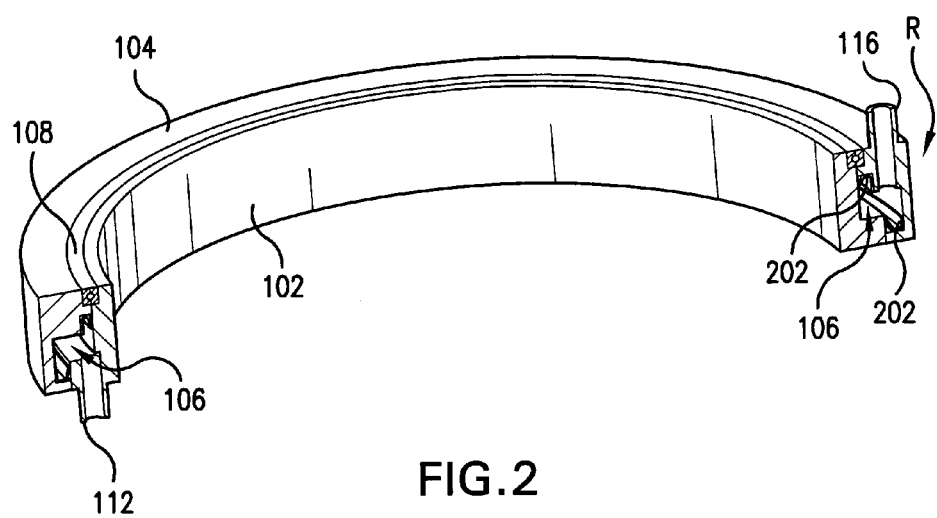
FIG. 2 is a cut-away perspective view of the rotary joint shown in FIG. 1.
Figure 3:
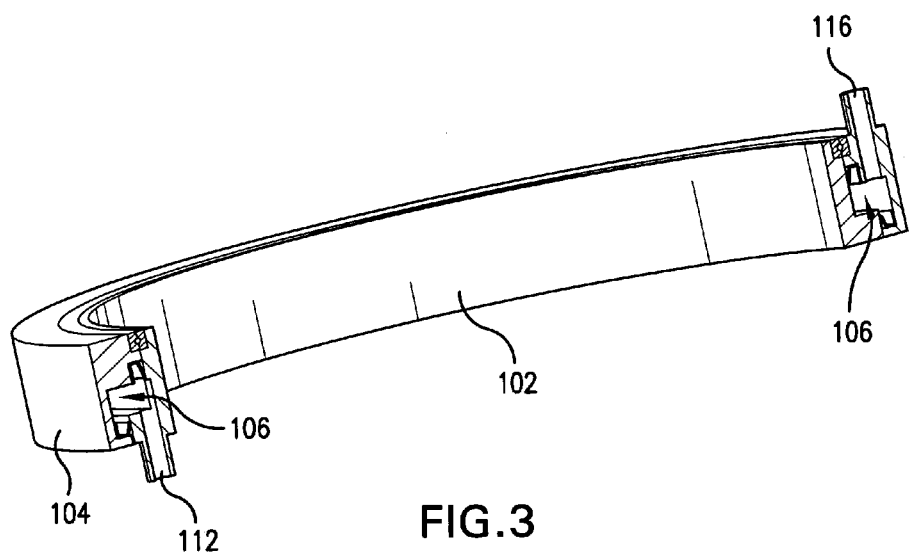
FIG. 3 is another cut-away perspective view of the rotary joint shown in FIG. 1.
Figure 4:
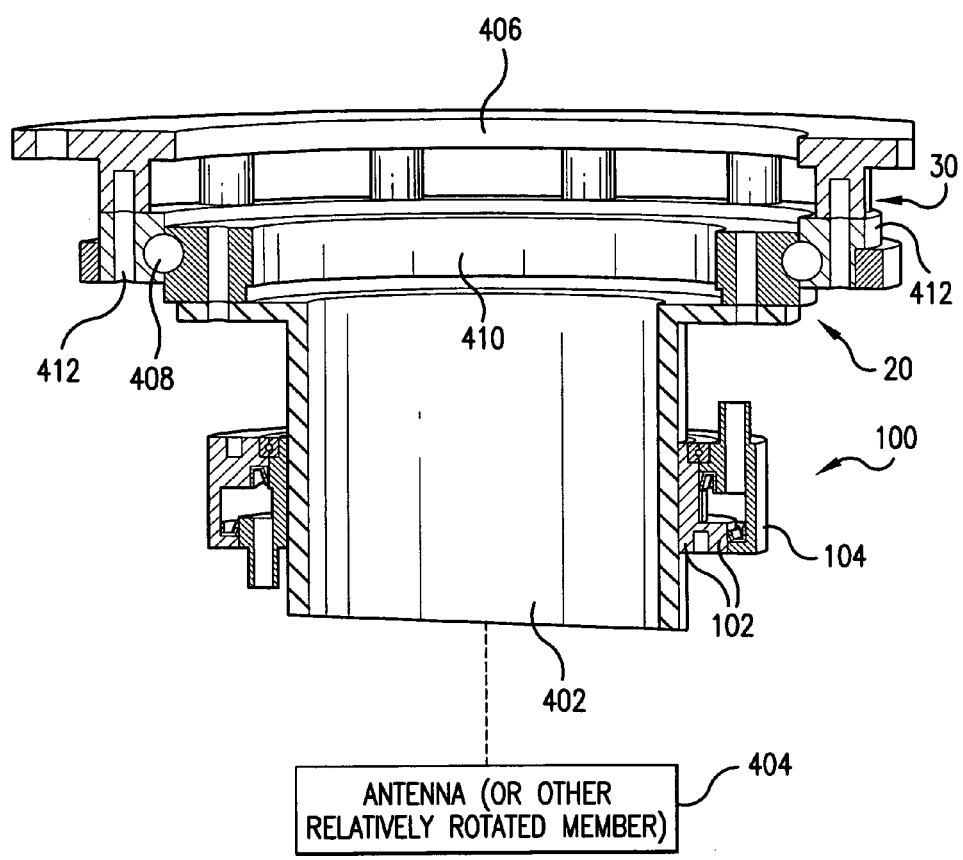
FIG. 4 is a cut-away side view of the hollow shaft fluid rotary joint in FIG. 1 as employed in an illustrative application.
Figure 5:
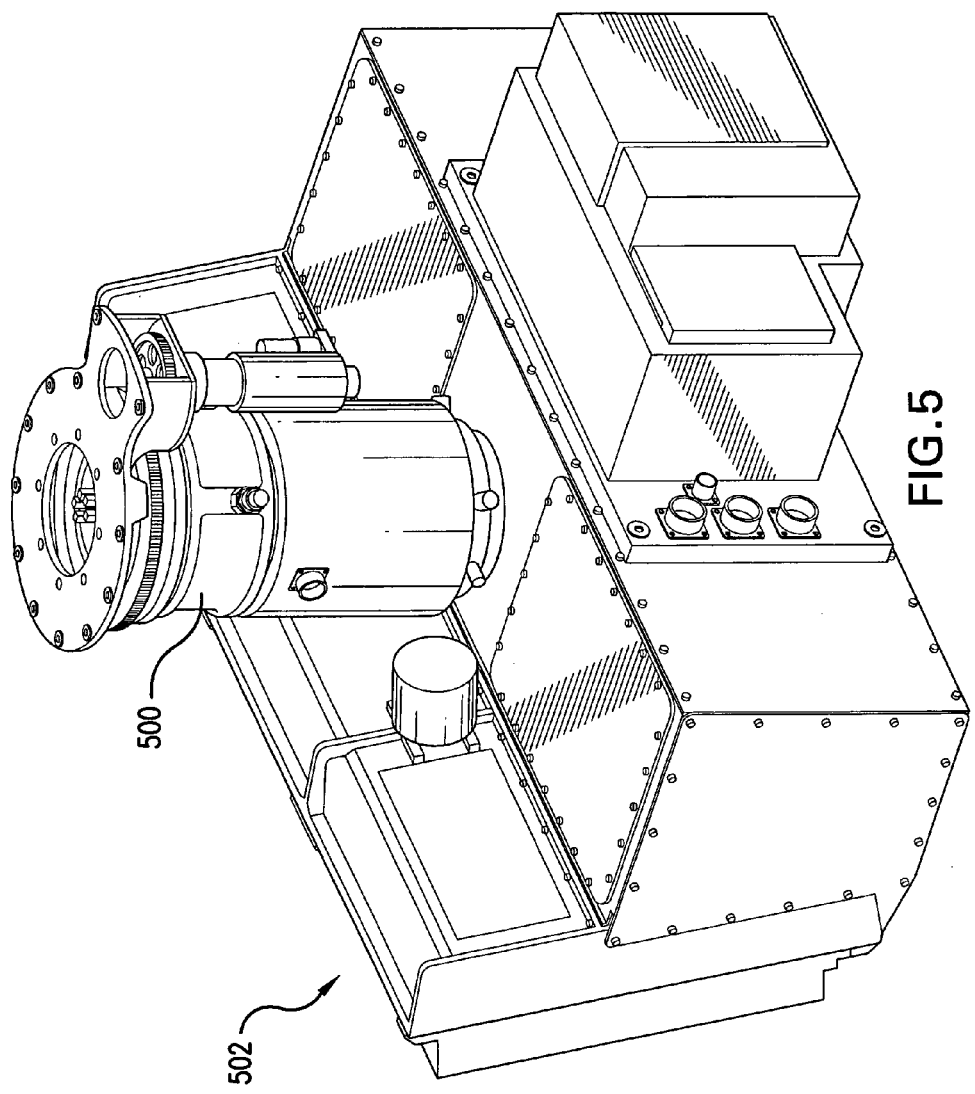
FIG. 5 is a perspective view of another hollow shaft fluid rotary joint according to some other embodiments and as employed in an illustrative application.

With reference to the figures, FIGS. 1-3 show an illustrative embodiment of a hollow shaft fluid rotary joint 100 according to some preferred embodiments. FIG. 4 shows the embodiment of FIGS. 1-3 employed in an illustrative environment related to a rotary device, such as, e.g., a rotary antenna.

As shown in FIG. 1, the hollow shaft fluid rotary joint 100 includes two main elements: an inner race 102 and an outer race 104. In the illustrative embodiment shown in FIGS. 1-4, as shown at the right side of FIG. 2 in the region R, the inner race 102 has a generally L-shaped cross-section and the outer race 104 has a generally inverted-L-shaped (i.e., ⌐-shaped) cross-section, such that the inner and outer race together form an internal flowable medium chamber 106 through which a flowable medium can flow. In the illustrated embodiment, the junctures between the inner and outer race are sealed with a hydraulic seal 202 (e.g., an elastomeric seal and/or another appropriate seal). As also shown in the illustrated embodiment, to facilitate relative rotation of the inner and outer races, a bearing 108 is preferably provided. Any appropriate bearing can be employed. However, in some preferred embodiments, the bearing employed is a permanently lubricated bearing. In addition, the bearing employed is preferably double shielded.

In the embodiment shown in FIGS. 1-3, fluid or the like can enter the fluid chamber 106 via the inlet/outlet 116, 112 in the outer race 104 and/or the inner race 102 and can exit the chamber via the other of these inlets/outlets 116, 112. That is, the direction of fluid flow can be selected based on circumstances. As shown, inner race 102 is preferably ring shaped and thereby forms a large open region 193. Preferably, the large open region 193 is substantially circular. Among other things, this large open region 193 can be used to enable cables, such as, e.g., power cables, communications/signal cables and/or other electrical lines or the like to pass through. Among other things, the open region can be used to transmit digital information, radio frequency transmissions, liquid (e.g., coolant), power (e.g., electrical power, combustible fuel and/or the like).

As indicated above, FIG. 4 shows an illustrative embodiment in which the embodiment of FIGS. 1-3 is employed in, e.g., a rotary device such as, e.g., a rotary antenna. By way of example, a rotary device may be supported for rotation via a gimbal or the like. In some examples, the gimbal may include, e.g., drive mechanisms, electronics, gearing, bearings, supports for items rotated, such as, e.g., antennas and/or the like. In FIG. 4, the hollow shaft fluid rotary joint is shown at 100. In this figure, the inner race is fixedly attached so as to rotate along with a spindle 402. As schematically depicted with dashed lines in FIG. 4, the spindle 402 can be used to support a relatively rotated object, such as, e.g., an antenna 404 or the like. In the embodiment shown, a support plate 406 can be fixedly mounted to a desired support, such as, e.g., to a fixed item, to a vehicle (such as, e.g., an aircraft or airplane) and/or to another appropriate item. In this example, spindle 402 is mounted so as to rotate with respect to the support plate 406 via a rotational bearing, such as, e.g., the gimbals' bearing 408 as shown. The materials for the various components can be selected based on circumstances. However, in some instances the spindle 402 may be made with aluminum, the support plate 406 can be made with aluminum, and the bearings 408 can include steel and/or the like. In some embodiments, if desired, the inner race 102 can be configured such that heat can dissipate readily therethrough so as to effectively be able to operate to serve as a cooling mechanism directly therethrough.

In FIG. 4, the elements 20 and 30 depict junctures at which components are to be fixedly connected, such as, e.g., using bolts or the like. Accordingly, spindle 402 may be fixedly attached to an annular ring 410 at the gimbals' bearing 408 and support plate 406 may be fixedly attached to an annular ring 412 at the other side of the gimbals' bearing 408. Although not depicted in FIG. 4, in preferred embodiments, the outer race 104 may be fixed relative to the support plate 406, such that the inner race 102 is moved along with the rotation of, e.g., an antenna or the like, while the outer race 104 is fixed relative to the antenna support or the like. However, in other embodiments, the relative movements can be altered or otherwise selected depending on circumstances.

FIGS. 5-7(B) show another hollow shaft fluid rotary joint 500 according to some preferred embodiments and implemented in one non-limiting application. With respect to FIG. 5, this figure generally depicts the implementation of the hollow shaft fluid rotary joint 500 in a location so as to provide cooling capacity for an antenna 502. However, it should be appreciated based on this disclosure that the hollow shaft fluid rotary joint 500 shown in these figures can also be implemented in other appropriate environments.

Figure 6A:
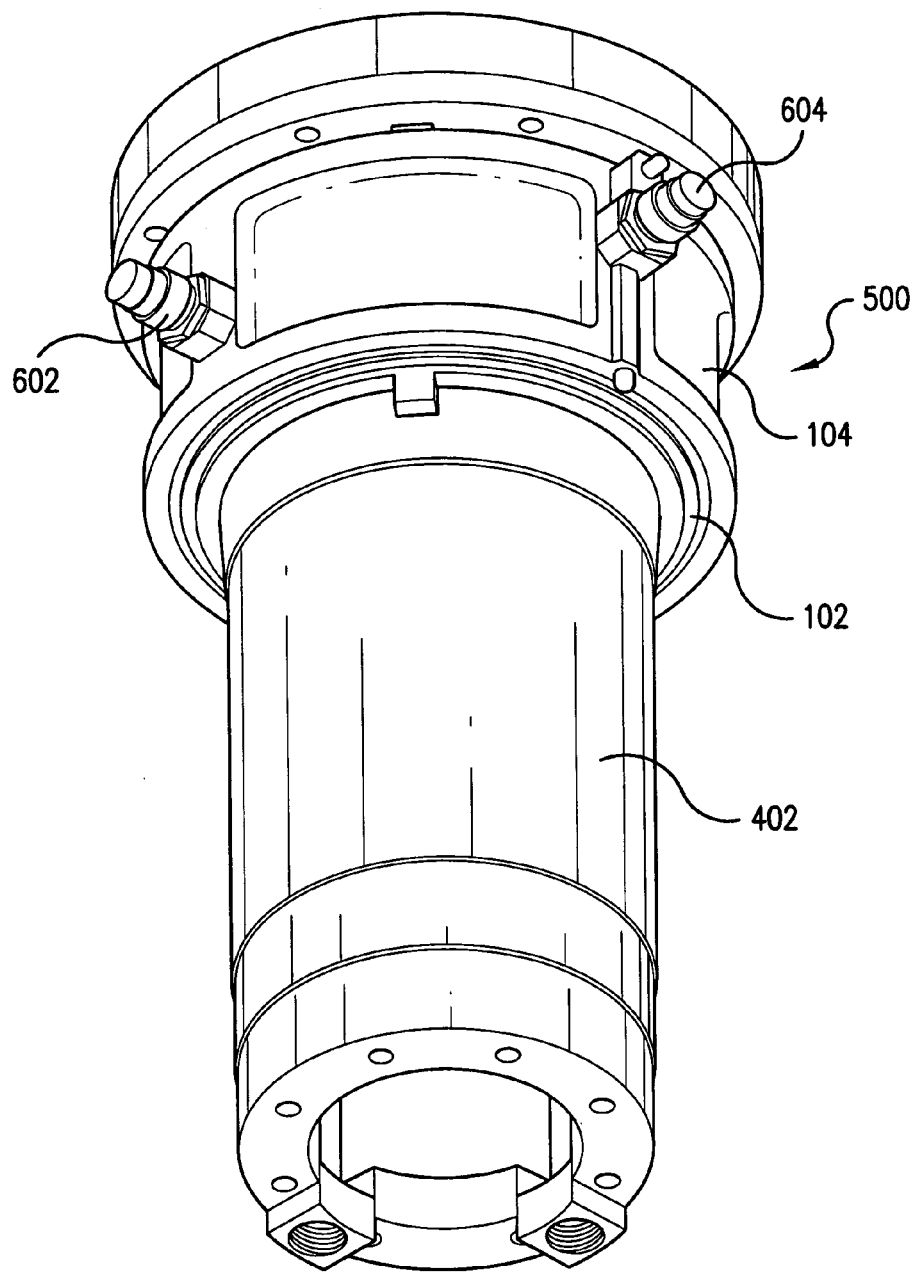
FIGS. 6(A) and 6(B) are bottom perspective and cross-sectional side views, respectively, of the hollow shaft fluid rotary joint shown in FIG. 5 as mounted in the illustrative application.
Figure 6B:
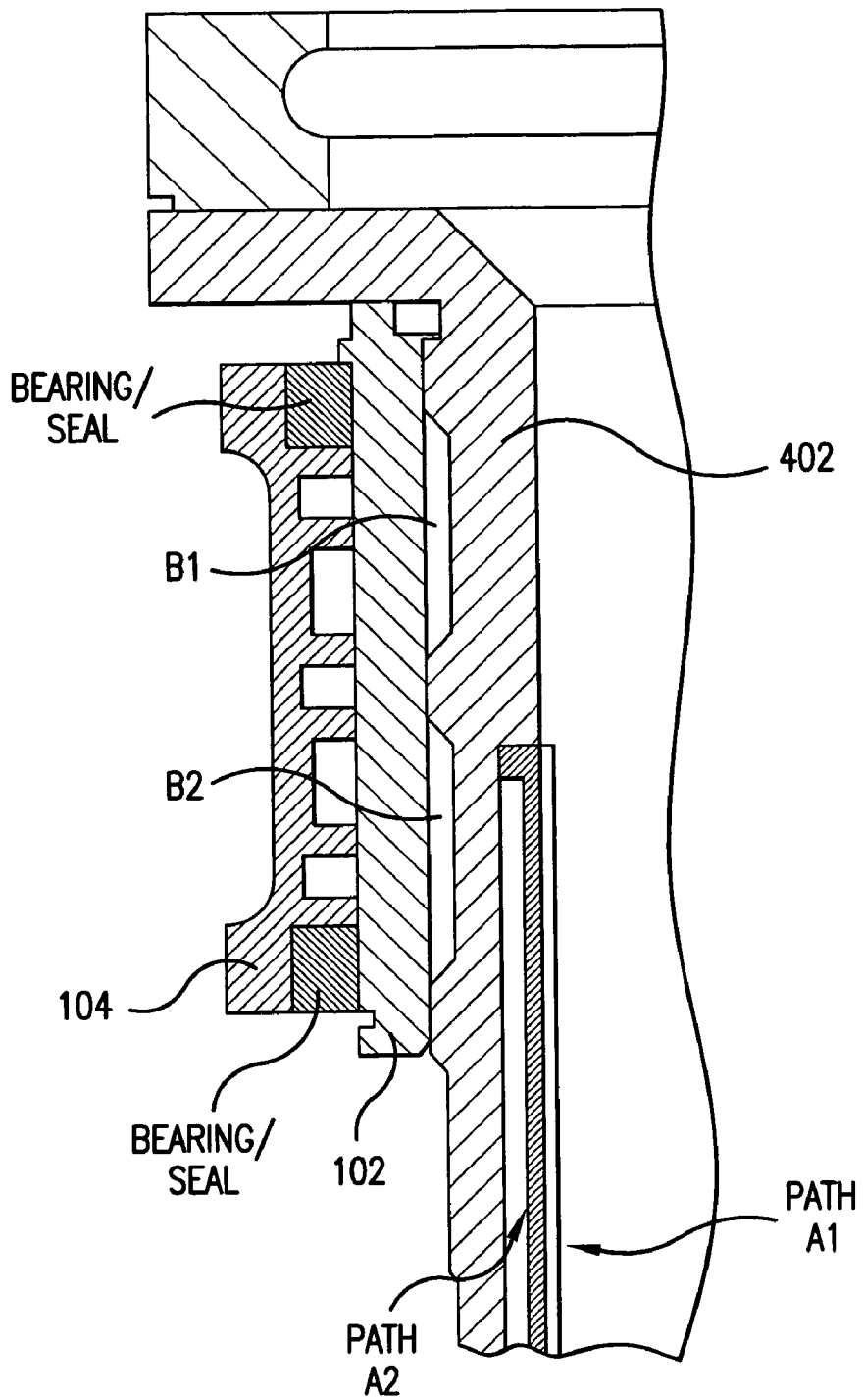

As shown in FIGS. 6(A) and 6(B), in this illustrative embodiment, the hollow shaft fluid rotary joint 500 includes a modified structure. It should be appreciated that features in the embodiment shown in FIGS. 1-4 can be combined with features in the embodiment shown in FIGS. 5 to 7(B). That is, elements from these embodiments can be combined freely depending on circumstances at hand. For example, in this second embodiment, the hollow shaft fluid rotary joint 500 includes inlet and outlet ports 602,604 situated on an outer peripheral surface of the outer race 104 and on an inside wall of the inner race 102. By way of example, the positions of the inlet and outlet ports 602,604 may vary based on circumstances.

This second embodiment also depicts a modified structure in which the hollow shaft fluid rotary joint 500 includes a plurality of flow paths. In this regard, the embodiment shown in FIGS. 1-4 only depicted a single flow path. In this second embodiment, however, fluid or the like can flow in plural paths (e.g., path B1 and path B2) to, for example, accommodate different fluids and/or flow directions. Accordingly, among other things, this can be used to facilitate a cyclical flow, such as, e.g., to establish a coolant circulation path as shown in the figures. While these figures show two flow paths, it should be understood that these principles can be applied to achieve any appropriate number of flow paths, such as, e.g., 3, 4, 5, 6, or more flow paths. In this regard, as seen in FIG. 6(B), the inner and outer races in this embodiment are preferably configured to define a plurality of substantially separate annular flow paths, such as, e.g., configured as annular channel rings in the illustrated embodiment, which rings are longitudinally displaced along the spindle 402. Thus, the number of annular rings can be selected to suit the needs at hand. Here, the cross-sections of the inner and outer races are altered from the first embodiment, but this second embodiment still maintains a large central opening (shown through the spindle) through which cables and/or other items as described above may pass.

In contrast to the first embodiment, this second embodiment includes fluid flow paths A1 and A2 integrated inside the spindle 402. This alternate structure can be selected depending on circumstances. As noted above, the spindle 402 and the inner race 102 are preferably fixedly connected to move in unison. As a result, these members could potentially even be co-formed or unitarily formed together in some embodiments. In this second illustrative embodiment, plural flow paths are provided while maintaining a substantially compact design by displacing flow paths along the spindle or the like around the periphery thereof, such as, e.g., separated by 90 degrees in this illustrative and non-limiting example. In this manner, a plurality of flow paths can be implemented without significantly, if at all, increasing the diameter of the hollow shaft fluid rotary joint structure and without limiting internal open space within the joint.

While a variety of embodiments can employ one or more of the principles described herein, in some illustrative embodiments, the hollow shaft fluid rotary joint can include dimensions that are generally proportional to that shown in the embodiments in the figures and generally to scale therewith. In some preferred embodiments, the diameter across the outer perimeter of the outer race is less than about 2 feet, and, in some other preferred embodiments, the diameter across the outer perimeter of the outer race is less than about 1½ feet, and, in some other preferred embodiments, the diameter across the outer perimeter of the outer race is less than about 1 foot, and, in some other preferred embodiments, the diameter across the outer perimeter of the outer race is less than about 9 inches, and, in some other preferred embodiments, the diameter across the outer perimeter of the outer race is less than about 6 inches or even less.

In some embodiments, the volume flow rate through the flow paths can be more than a few gallons per minute, and, in some embodiments, the volume flow rates can be more than about 5 or more gallons per minute. Additionally, in some preferred embodiments, the central opening is substantial enough to accommodate substantial power cables carrying a large amount of kilowatts, such as hundreds of kilowatts or even thousands of kilowatts transmitted therethrough.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An apparatus comprising a coaxial fluid rotary joint, the coaxial fluid rotary joint comprising:
    a first generally annular structure;
    a second generally annular structure surrounded by the first annular structure and coaxially aligned with the first annular structure;
    a bearing disposed between the first and second annular structures to enable at least one of the annular structures to rotate relative to the other annular structure about a common axis;
    an internal fluid channel formed between an outer surface of the second annular structure and an inner surface of the first annular structure;
    an input port in fluid communication with the fluid channel; and
    an output port in fluid communication with the fluid channel, wherein
    the first generally annular structure comprises a first wall and a second wall that is perpendicular to the first wall, wherein the second wall extends from the first wall towards the second generally annular structure,
    the second generally annular structure comprises a first wall and a second wall that is perpendicular to the first wall, wherein the second wall extends from the first wall towards the first generally annular structure, and
    the second wall of the first generally annular structure contacts the second wall of the second generally annular structure.

2. The apparatus of claim 1, wherein the coaxial fluid rotary joint further comprises a sealing means for sealing the internal fluid channel.

3. The apparatus of claim 1, further comprising a spindle fixedly attached to the second annular structure.

4. The apparatus of claim 3, further comprising an antenna attached to the spindle.

5. The apparatus of claim 4, further comprising a support plate that is fixed relative to the first annular structure.

6. The apparatus of claim 5, wherein the support plate is fixedly mounted to a support of a vehicle.

7. The apparatus of claim 6, wherein the vehicle is an aircraft.

8. The apparatus of claim 5, wherein the spindle can rotate with respect to the support plate.

9. The apparatus of claim 3, wherein the spindle is hollow.

10. The apparatus of claim 9, wherein one or more fluid flow paths are integrated inside of the spindle.

11. The apparatus of claim 9, wherein the spindle has an opening at each end thereof, thereby enabling a cable to pass through the spindle.

12. The apparatus of claim 11, wherein the coaxial fluid rotary joint further comprises:
    a second internal fluid channel formed between an outer surface of the second annular structure and an inner surface of the first annular structure;
    a second input port in fluid communication with the second fluid channel; and
    a second output port in fluid communication with the second fluid channel.

13. An apparatus comprising a coaxial fluid rotary joint, the coaxial fluid rotary joint comprising:
    a first generally annular structure;
    a second generally annular structure surrounded by the first annular structure and coaxially aligned with the first annular structure;
    a bearing disposed between the first and second annular structures to enable at least one of the annular structures to rotate relative to the other annular structure about a common axis;
    an internal fluid channel formed between an outer surface of the second annular structure and an inner surface of the first annular structure;
    an input port in fluid communication with the fluid channel;
    an output port in fluid communication with the fluid channel;
    a spindle fixedly attached to the second annular structure; and
    an antenna attached to the spindle.

14. The apparatus of claim 13, further comprising a support plate that is fixed relative to the first annular structure.

15. The apparatus of claim 14, wherein the support plate is fixedly mounted to a support of a vehicle.

16. The apparatus of claim 15, wherein the vehicle is an aircraft.

17. The apparatus of claim 13, wherein the spindle can rotates with respect to the support plate.

18. The apparatus of claim 13, wherein the spindle is hollow.

19. The apparatus of claim 18, wherein one or more fluid flow paths are integrated inside of the spindle.

20. The apparatus of claim 18, wherein the spindle has an opening at each end thereof, thereby enabling a cable to pass through the spindle.

21. The apparatus of claim 20, wherein the coaxial fluid rotary joint further comprises:
    a second internal fluid channel formed between an outer surface of the second annular structure and an inner surface of the first annular structure;
    a second input port in fluid communication with the second fluid channel; and
    a second output port in fluid communication with the second fluid channel.

22. The apparatus of claim 13, wherein the coaxial fluid rotary joint further comprises a sealing means for sealing the internal fluid channel.

* * * * *